INVENTORS:
JOHN G. CURTIS.
DOUGLAS R. BARTON.
BY
ATTORNEY.

July 29, 1958

D. R. BARTON ET AL 2,845,251

MOBILE ROCK DRILL RIG

Filed April 3, 1956

INVENTORS:
JOHN C. CURTIS.
DOUGLAS R. BARTON.
BY

ATTORNEY.

July 29, 1958

D. R. BARTON ET AL 2,845,251

MOBILE ROCK DRILL RIG

Filed April 3, 1956

INVENTORS:
JOHN G. CURTIS,
DOUGLAS R. BARTON.
BY
Charles F. Osgood,
ATTORNEY.

July 29, 1958
D. R. BARTON ET AL
2,845,251
MOBILE ROCK DRILL RIG
Filed April 3, 1956
6 Sheets-Sheet 5
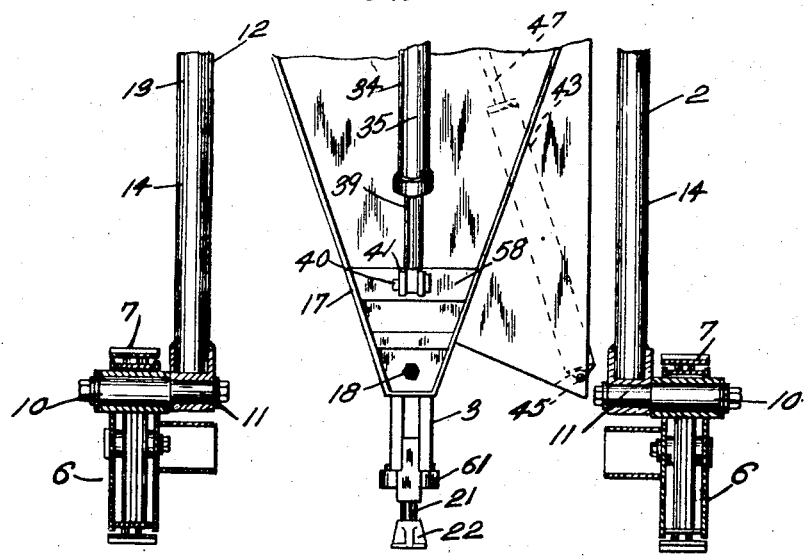
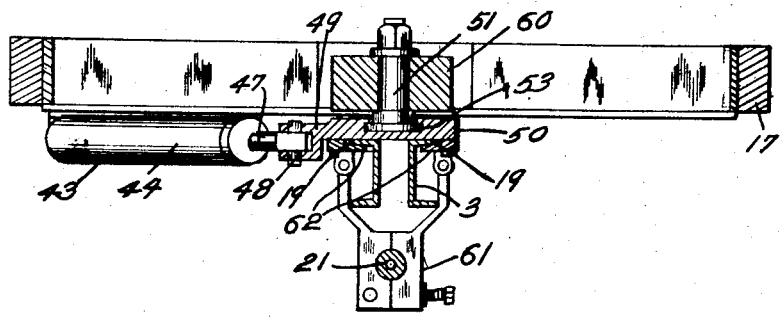
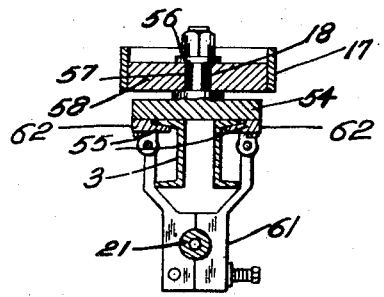
INVENTORS:
JOHN C. CURTIS.
DOUGLAS R. BARTON.
BY Charles F. Osgood,
ATTORNEY.

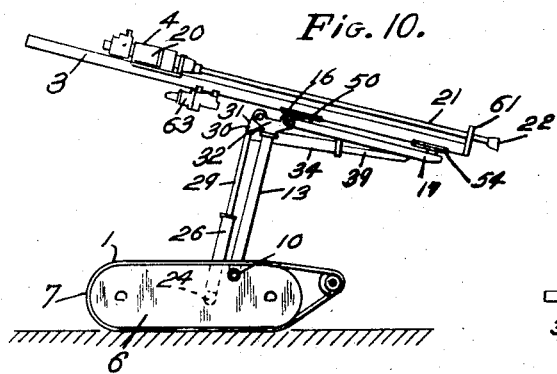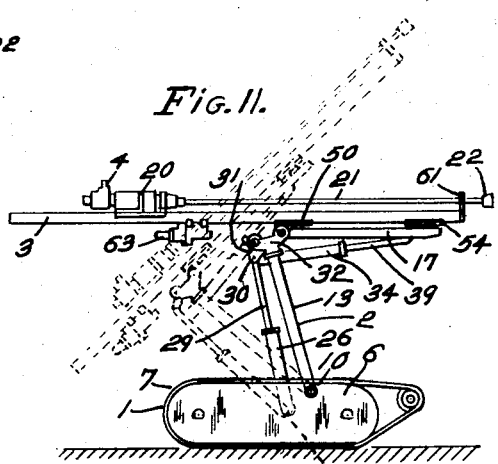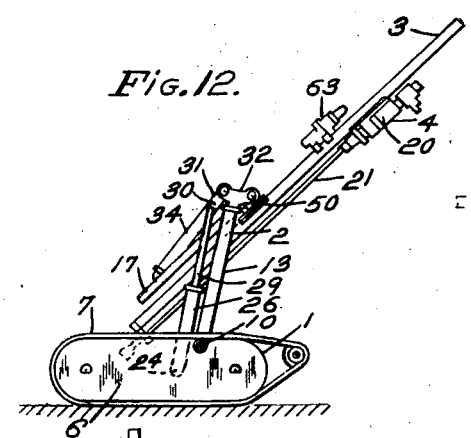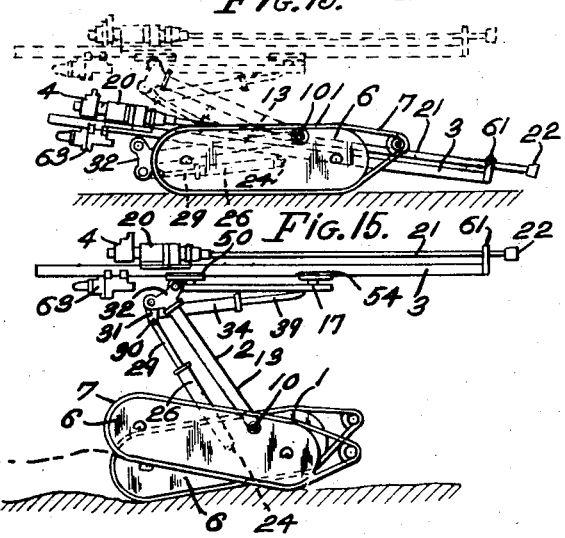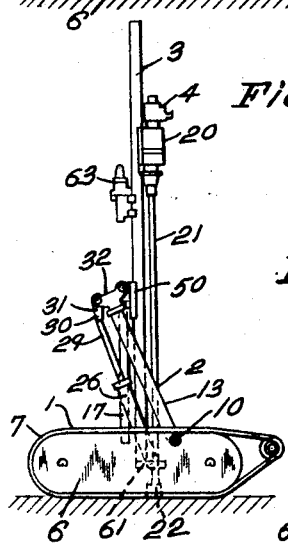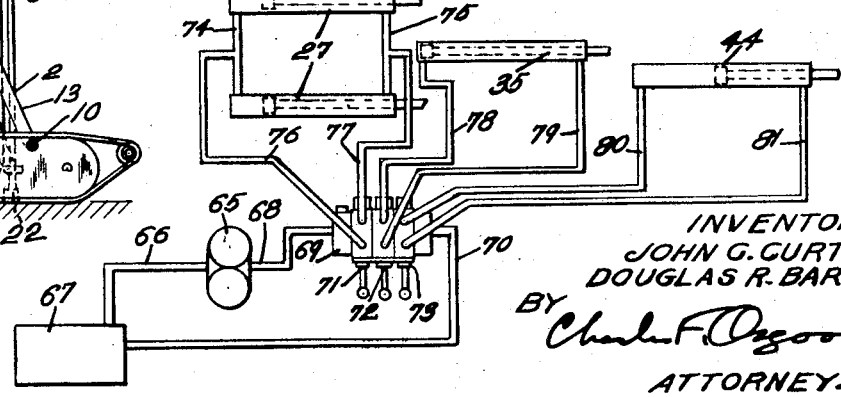

United States Patent Office 2,845,251
Patented July 29, 1958

2,845,251

MOBILE ROCK DRILL RIG

Douglas R. Barton and John C. Curtis, Newport, N. H., assignors to Joy Manufacturing Company, Pittsburgh, Pa., a corporation of Pennsylvania Application April 3, 1956, Serial No. 575,777

26 Claims. (Cl. 255—51)

This invention relates to mobile rock drills and more particularly to a mechanized mobile drill rig having adjustable supporting means whose adjustments are effected by power for adjusting the hammer drilling tool through a wide range of operating positions.

In conventional mobile rock drill rigs the drilling tool is usually adjustably mounted on a mobile base and it is customary for the operator and his helpers to assume the relatively heavy and time consuming work of manually loosening and tightening saddle clamps, etc., to effect adjustment of the parts of the adjustable support for the drilling tool and to effect leveling up of the machine. The present invention contemplates improvements over known types of mobile rock drill rigs, sometimes called "wagon" drills, in that the various adjusting operations are effected by power under the control of a single operator so that the machine is entirely mechanized thereby facilitating and expediting the drilling operation.

The rock drill of the present invention, in its illustrative embodiment, is mounted on a mobile crawler base and each crawler side frame of the base is tiltable independently of the other so that the machine may traverse and be firmly supported on an undulating or uneven terrain. The elongated guide frame for the hammer drilling tool is pivotally supported at its forward end for lateral tilting movement and may be secured in position thereby to maintain the lower end of the guide frame and the feed for the drilling tool relatively rigid in a very desirable manner. The drill guide frame and the tool feed are adjustable into different operating positions both laterally and in vertical planes by power devices and the drilling tool may be adjustably supported by its supporting means to drill a hole at any practical angle as is especially desirable in construction and quarry work. Moreover, the drilling tool may be adjustably supported by its supporting means on the mobile base to drill a vertical hole practically at the center of the base, which is the drilling position most commonly employed. Each tiltable side frame for the crawler treads is independent of the other and the drill support is pivotally mounted on the tread frames with the support having but one pivotal connection with each tread frame, and extensible fluid jacks are connected between the tread frames and the tool support so that one jack may be partially extended while the other is partially collapsed and vice versa, as desired, thereby to make the tread frames self-stabilizing. The opposite ends of the fluid jacks are connected together by fluid conduits providing a closed fluid system so that the jack may extend and collapse freely as the drill is being trammed from place to place over a relatively rough terrain and these fluid jacks may be employed to lock the tread frames at relatively different levels during the drilling operation regardless of the slope of the terrain or the position of the base on the terrain, and the jacks may be operated in unison to raise and lower the adjustable support for the drilling tool. By the provision of the various fluid jacks for adjusting the several supporting parts of the tool supporting means the drilling tool may be adjusted by power through an unusually wide range of drilling positions under the control of a single operator, and the controls for the drills are desirably grouped together so as to facilitate control of the drill from a single operator's station.

An object of this invention is to provide an improved mechanized mobile rock drill especially designed for construction and quarry work. Another object is to provide an improved mobile rock drill rig having an improved adjustable supporting structure for the drilling tool whereby the latter may be adjusted through a relatively wide range of drilling positions with respect to the work. Yet another object is to provide an improved mechanized crawler mounted mobile rock drill which may readily traverse relatively rough terrain. A further object is to provide an improved articulated boom structure for adjustably supporting the drilling tool in different operating positions and having improved power operated devices for separately or in unison adjusting the articulated parts of the boom structure. Another object is to provide an improved mobile drill having adjustable supporting means for the drilling tool whereby the latter may be adjusted by power through a relatively wide range of operating positions thereby enabling operation of the drilling by a single workman. A still further object is to provide an improved adjustable mobile rock drill structure of the fluid operated type having an improved arrangement of the fluid conducting means leading to the several fluid operated devices of the machine. These and other objects and advantages of the invention will however hereinafter more fully appear.

In the accompanying drawings there is shown for purposes of illustration one form which the invention may assume in practice.

In these drawings:

Fig. 7 is a fragmentary cross section taken on line 7—7 of Fig. 4.

Fig. 8 is an enlarged detail section taken on line 8—8 of Fig. 5, showing the transversely slidable pivot for the tool guide frame.

Fig. 9 is an enlarged detail section taken on line 9—9 of Fig. 5, showing the tool guide frame and drill steel centralizer.

Figure 1:
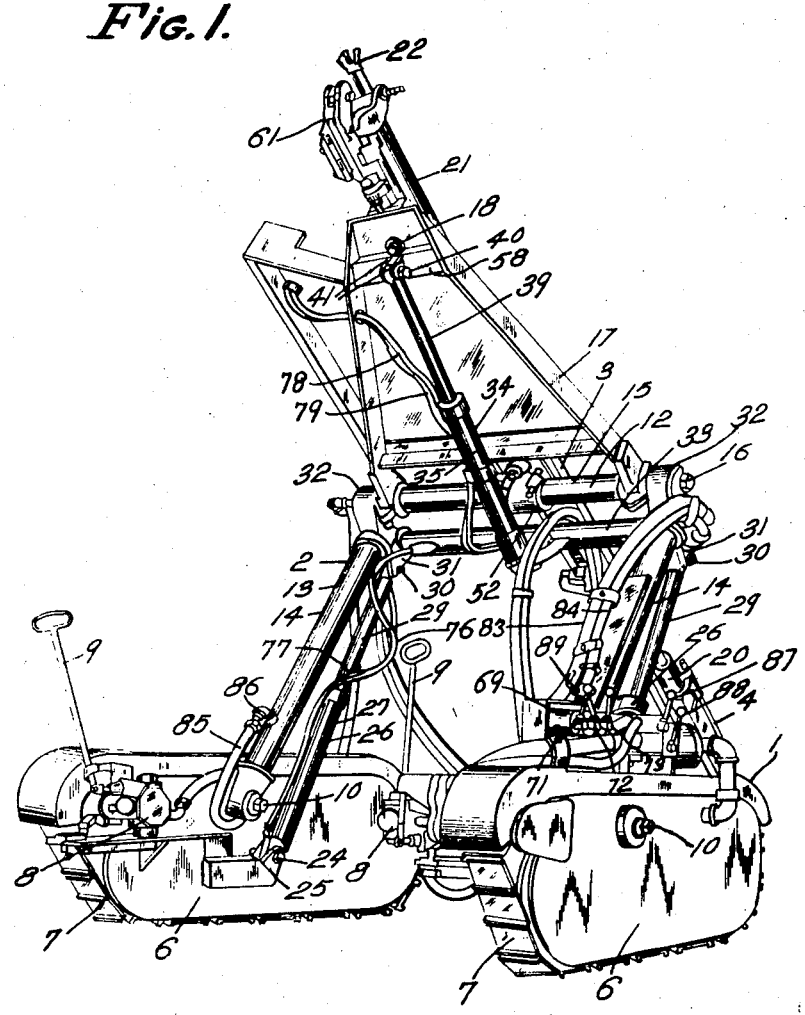
Fig. 1 is a front perspective view of the improved mobile rock drill, showing the tool supporting boom in elevated position.

Figs. 10 to 15 inclusive are diagrammatic views, showing the drill in different adjusted positions.

Fig. 16 is a diagrammatic view showing the hydraulic fluid system.

The improved mobile rock drill comprises a mobile base 1 on which is adjustably mounted a supporting structure 2 for an elongated drill guide frame 3 along which a hammer drilling tool 4 is guided for movement longitudinally therealong.

The mobile base is herein desirably a crawler base comprising independently tiltable side frames 6 about which endless crawler treads 7 are guided for orbital circulation. Conventional fluid motors 8, desirably operated by compressed air, are operatively connected through conventional speed reducers to the crawler treads and these motors are desirably reversible to provide for reverse drive. The motors are provided with separate control handles 9 whereby the operator, while occupying a position between the treads, may readily control the motors to effect propulsion and steering of the base, in a well-known manner.

Pivotally mounted on horizontal transverse axes 10 on aligned pivot shafts 11 at the inner sides of the tread frames is an adjustable drill supporting structure or articulated boom 12 comprising an inner boom frame 13 of inverted U-shape having side arms or legs 14 and an outer cross connection portion or cross bar 15, and pivotally mounted on an axis 16 parallel to the cross bar 15 on the outer portion of the inner boom frame is an outer boom frame 17 of generally triangular shape, the latter forming a continuation of the inner boom frame to provide an elongated boom structure which may be adjusted through a relatively wide range in vertical planes with respect to the base. In this improved construction, pivotally mounted at 18 near the outer apex portion of the triangular boom frame 17, on an axis perpendicular to a line parallel with the boom frame pivot axis 10 and 16, is the elongated guide frame 3 along the guideways 19 of which is guided the drilling tool 4 which has a conventional compressed air type hammer motor 20 for percussively actuating a drill steel 21 carrying a drill bit 22.

Pivotally connected at 24 to brackets 25 (Fig. 6) attached to the inner sides of the tread frames are extensible power devices or fluid jacks 26 comprising fluid cylinders 27 containing reciprocable pistons 28. These pistons have their piston rods 29 pivotally connected at 30 to lugs 31 integral with brackets 32 carried at the outer ends of the side arms or legs 14 of the U-shaped boom frame. Also secured to the brackets 32 and arranged in parallelism with the cross connecting portion 15 of the U-shaped frame is a tubular cross member 33. An extensible power jack device or fluid jack 34 comprises a hydraulic cylinder 35 (Fig. 6) pivotally connected at 36 to lugs 37 integral with the cross member 33. This cylinder contains a reciprocable piston 38 having its piston rod 39 pivotally connected at 40 to lugs 41 secured to the forward or outer portion of the triangular shaped boom frame 17.

Figure 2:
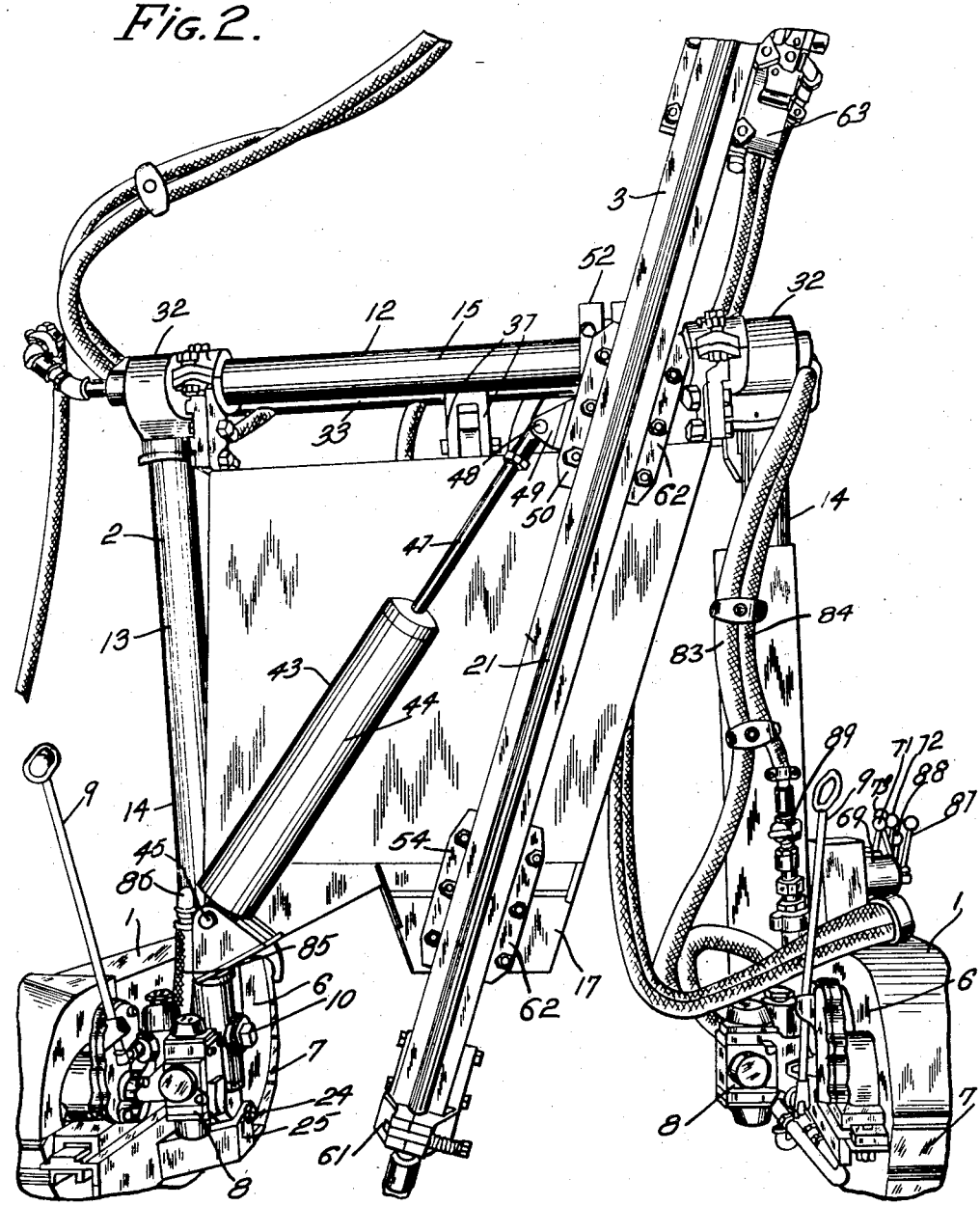
Fig. 2 is an enlarged fragmentary front elevational view of the drill showing structural details.
Figure 5:
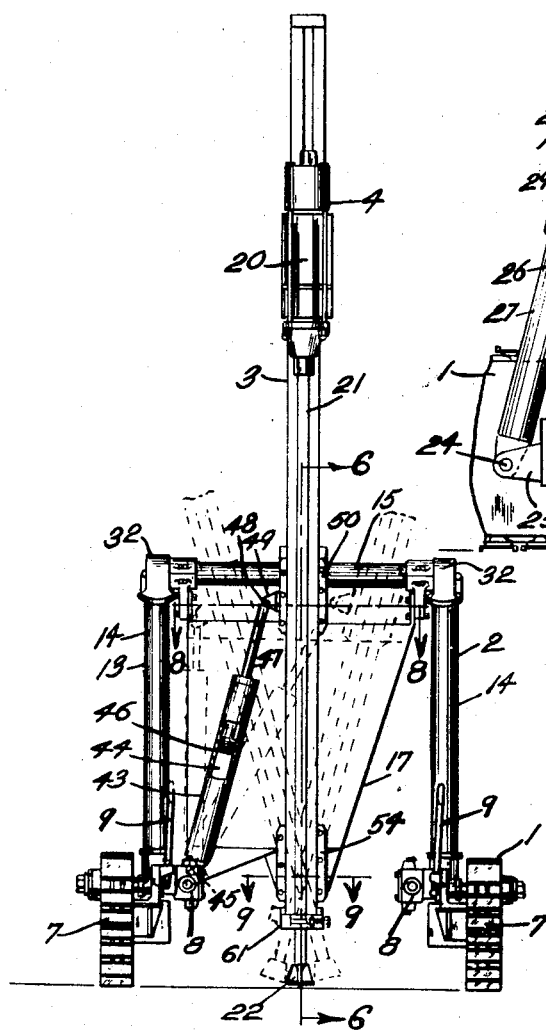
Fig. 5 is a front elevational view of the drill.

As shown in Figs. 2 and 5, there is an extensible power device or fluid jack 43 comprising a hydraulic cylinder 44 pivotally connected at 45 to the boom frame 17 and reciprocable in this cylinder is a piston 46 having its piston rod 47 pivotally connected at 48 to lugs 49 integral with a support 50 for the drill guide frame 3. This guide frame support 50 is pivotally mounted on a pivot pin 51 (Fig. 8) secured to a support member 52 slidingly guided on the cross connecting portion 15 of the U-shaped boom frame. The guide frame 3 has an endwise sliding connection with the support 50 and the latter has a sliding connection at 53 with the head of the pivot pin 51, as shown, to compensate for the straight path of movement of the support 50 along the cross connecting portion 15 during swinging of the guide frame about its forward pivotal connection 18 relative to the boom frame.

Figure 6:
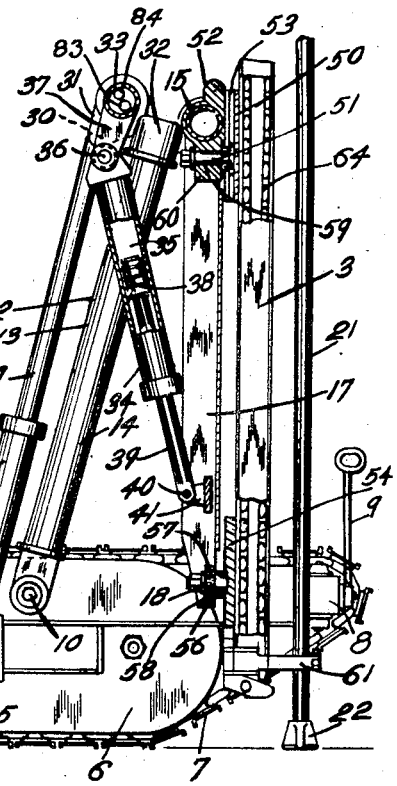
Fig. 6 is an enlarged vertical section taken on line 6—6 of Fig. 5.

The forward pivotal connection 18 comprises a swiveled support 54 (Fig. 9) to which the guide frame 3 is adjustably secured at 55 and the support 54 has a pivot member 56 engaged in a bearing 57 on a plate member 58 rigidly secured to the outer boom frame 17. As shown in Figs. 6 and 8, the pivot member 51 for the support 50 is engaged in a bearing 59 in a depending lug 60 integral with the sliding support 52. Carried at the front or lower end of the drill guide frame 3 is a conventional drill steel centralizer 61 for guiding the drill steel during starting or "spotting" of a hole and after the hole is started this centralizer may be released, in a well-known manner. Conventional clamps 62, adjustable by screws, are provided for securing the guide frame in its endwise adjusted positions with respect to the supports 50 and 54, as shown.

The hammer drilling tool 4 has power operated feeding means for moving the same back and forth along the guide frame 3 including a compressed air feed motor 63 (Figs. 3 and 4) which actuates a feed chain 64 (Fig. 6) in a manner generally similar to that disclosed in the U. S. Patent No. 2,559,282 to J. C. Curtis, owned by the assignee of the present invention.

Now referring to the hydraulic fluid system shown diagrammatically in Fig. 16, it will be noted that a motor driven pump 65, which may be enclosed within one of the tread frames, has its suction side connected by a conduit 66 to a fluid tank 67 which contains a liquid. The discharge side of the pump is connected by a conduit 68 to the pressure passage of a conventional valve box 69 which is herein desirably mounted on the top of one of the tread frames. This valve box is connected by a return conduit 70 back to the tank. The valve box has usual parallel bores containing control valves 71, 72 and 73 respectively, desirably of the balance spool slide type each having a suitable operating handle. By-pass conduits 74 and 75 freely connect the ends of the jack cylinders 27 together, and the bore containing the slide valve 71 is connected by conduits 76 and 77 to the conduits 74 and 75 respectively. The bore containing the slide valve 72 is connected by conduits 78 and 79 to the opposite ends of the jack cylinder 35, while the bore containing the slide valve 73 is connected by conduits 80 and 81 to the opposite ends of the jack cylinder 44.

Air and liquid hose lines 83 and 84 extend above a tread frame and upwardly along one of the boom legs 14 and into the tubular cross member 33 at the outer portion of the U-shaped boom frame and these hose lines lead from the tubular cross member to the motor 20 of the hammer drilling tool 4, to the feed motor 63, and to the several jack cylinders 27, 35 and 44. The tubular cross member 33 thereby serves to guide and support the portions of the hose lines extending therethrough. The air line has branches 85 extending down through the legs of the U-shaped boom frame and out at 86 to the motors 8 for driving the tractor treads. The liquid hose leads to the drilling tool to supply water down through the drill steel to the drill bit at the hole bottom, in a well-known manner. Valves 87, 88 and 89 in the air lines are mounted near the hydraulic valves 71, 72 and 73 for controlling the flow of compressed air to the feed motor 63, to the drilling tool motor 20, and to the air line for blowing compressed air down through the drill steel to clean the drill hole. By extending the air and liquid hoses within the tubular cross member 33 of the lower boom frame the hose lines are adequately guided and supported thereby to avoid the undesirable "grapevine" effect usually present in adjustable drilling tools of the present character.

Figure 3:
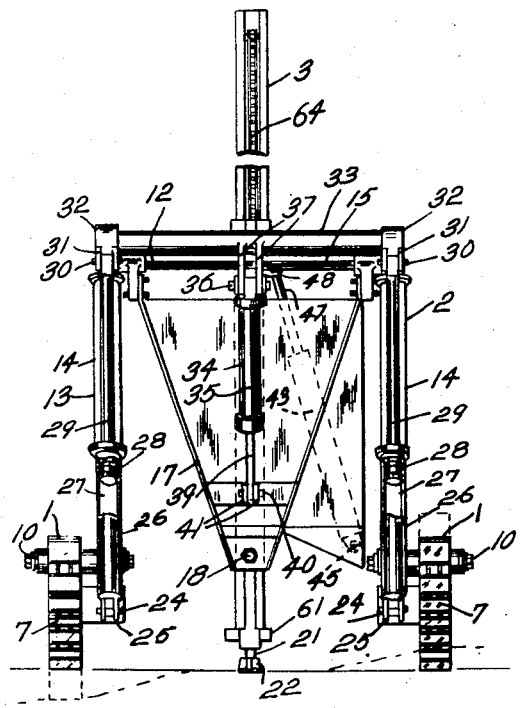
Fig. 3 is a rear elevational view of the drill.
Figure 4:
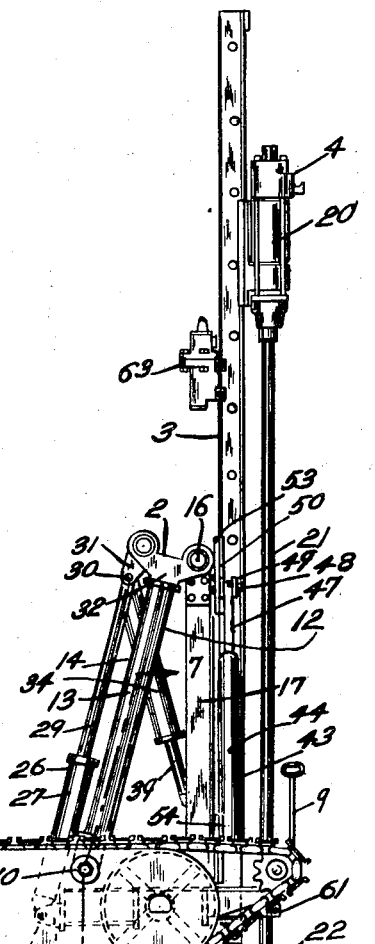
Fig. 4 is a side elevational view of the drill.

The general mode of operation of the improved rock drill will now be described. During tramming of the machine from one working place to another the elongated drill guide frame 3 may be swung into a horizontal position, as shown in Fig. 15, and the slide valve 71 may be positioned during tramming so that the liquid in the ends of the jack cylinders 27 may freely bypass from one cylinder end to the other in a closed circuit thereby to enable the tractor treads readily to traverse terrain which is undulating or uneven. If it is desired to effect drilling when one tread is down in a depression and the other is raised up on a hump, as shown in Figs. 3 and 15, the slide valve 71 may be closed to cut off communication between the conduits 76 and 77 so as to trap the liquid in the ends of the cylinders 27 thereby rigidly to lock the tread frames in position to stabilize the base. The slide valve 71 may be manipulated to supply liquid under pressure to the jack cylinders 27 to effect operation of the latter in unison thereby to swing the boom frames in vertical planes about the pivot of the inner boom frame 13, and, here again, by trapping the liquid in the cylinders 27 the inner boom frame may be rigidly held in adjusted position. By manipulating the valve 72 liquid under pressure may be supplied to the jack cylinder 35 to effect swinging of the outer boom frame 17 about its pivotal connection with the inner boom frame, and, here again, when liquid is trapped in the jack cylinder the outer boom frame may be locked in adjusted position. The drill guide frame 3 may be tilted sidewise about its pivot 18 by manipulating the slide valve 73 to effect supply of liquid under pressure to the jack cylinder 44 thereby to slide the support 50 laterally along the cross bar 15, and by trapping liquid in this cylinder the guide frame may be locked in its adjusted position. The motor 63 may be operated to feed the drilling tool back and forth along the guide frame 3, as desired.

In Figs. 10 to 15 inclusive the drilling tool is shown in different adjusted positions. In Fig. 10 the elongated guide frame 3 is in elevated position with its forward portion tilted downwardly for positioning the drilling tool to drill holes inclined downwardly with respect to the horizontal. In this position the boom frames 13 and 17 are disposed substantially 90° apart. In Fig. 11 the elongated drill frame is shown in horizontal elevated position in full lines and the elongated guide frame has its forward portion tilted upwardly at a substantial angle with respect to the horizontal as shown in dotted lines. In Fig. 12 the drill guide frame is tilted to direct the drilling tool rearwardly and downwardly with the upper boom frame 17 and the forward portion of the elongated guide frame 3 extending within the open space between the legs of the lower U-shaped boom frame 13. In Fig. 13 the elongated drill guide frame is in its lowered position down between the tread frames of the tractor base with the inner and outer boom frames 13 and 17 in substantially folded relation and with the elongated guide frame extending forwardly and downwardly at a slight angle with respect to the horizontal, close to the ground level, as shown in full lines. An intermediate elevated position of the elongated drill guide frame is shown in dotted lines in Fig. 13. In Fig. 14 the elongated drill guide frame 3 is positioned vertically with the drilling tool in vertical drilling position close to the center of the base where it normally will be used in most cases, and here, too, the outer boom frame and the forward portion of the drill guide frame extend between the legs of the lower U-shaped boom frame. The hydraulic jacks 26 and 34 may be operated separately or in unison to tilt the inner and outer boom frames about their respective pivots to effect adjustment of the drilling tool in the various positions discussed above. The hydraulic jack 43 may be operated to tilt the elongated guide frame 3 laterally about its pivot 18 between the dotted line positions shown in Fig. 5.

As a result of this invention an improved mobile rock drill is provided whereby a hammer drilling tool may be adjusted through a relatively wide range with respect to the work, quickly and with a minimum of effort on the part of the operator. By the provision of the articulated boom structure and the pivotal mounting for the elongated drill guide frame at the outer or forward end of the outer boom frame, the drilling tool may be readily adjusted while it is at all times firmly supported at its forward portion. The inverted U-shaped boom frame having its legs pivotally mounted at the inner sides of the separate tread frames enables the machine to traverse an undulating or uneven terrain with comparative ease. The U-shaped inner boom frame having its legs pivotally mounted on the separate tread frames, as disclosed, also enables the base to straddle or move over relatively large obstacles. The novel arrangement of liquid and air hose lines eliminates, to a large extent, the objectionable "grapevine" hose line effect heretofore frequently encountered in drills of this character. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What we claim as new and desire to secure by Letters Patent is:

1. A drill rig comprising a mobile base, a boom structure for supporting a drilling tool and pivotally mounted on said base to swing in vertical planes with respect thereto including an inner pivoted boom frame and an outer boom frame pivotally supported by said inner boom frame, a transverse pivotal connection between said boom frames, said boom frames being foldable about said pivotal connection closely together into positions of substantial parallelism and swingable angularly widely apart, and an elongated guide frame pivotally mounted at its forward portion on the outer portion of said outer boom frame and providing guiding means for a drilling tool, means for pivotally mounting said guide frame on said outer boom frame to provide for such pivoting thereof, means for swinging said boom frames about their respective pivots to vary the supported position of said guide frame, and means for swinging said guide frame about its pivot relative to said outer boom frame in any angular positions of said boom frames about their respective pivots.

2. A drill rig as set forth in claim 1 wherein said elongated drill guide frame is swingable on its pivotal mounting to tilt laterally relative to said outer boom frame in planes parallel to the pivotal axis of said pivotal connection between said boom frames to vary the angular position of said guide frame with respect to the vertical.

3. In a drill rig of the character disclosed, a mobile base having spaced apart side frames and ground engaging means carried thereby, said frames having independent relative tilting movement in upright planes, an elongated boom pivotally mounted on said base and carrying a drilling tool at its outer portion, said boom including a boom frame of inverted U-shape having its legs spaced apart and extending down along the inner sides of said side frames, means for pivotally mounting said legs at the inner sides of said side frames whereby said boom may swing in upright planes to move the drilling tool into positions at different elevations, said side frames being tiltable as aforesaid about their pivotal connections with said U-frame legs, means connected between said side frames and said boom frame for swinging the latter about its pivot, said spaced side frames and the spaced legs of said boom frame, when the latter is in substantially upright position, providing a wide open space longitudinally through the central portion of the bottom of the drill rig whereby the latter may readily traverse uneven ground and pass over obstacles on the ground.

4. A drill rig as set forth in claim 3 wherein said swinging means includes extensible self-locking power devices operatively connected between said spaced side frames and the sides of the outer portion of said U-shaped frame for swinging said U-shaped frame about its pivot and for separately locking said side frames against relative tilting movement in vertical planes, said power devices locking said side frames firmly in position on the ground to stabilize the base during the drilling operation.

5. A drill rig as set forth in claim 3 wherein an outer boom frame of generally triangular shape is pivotally mounted on the outer portion of said inner U-shaped frame to swing relative thereto and extending outwardly therefrom, said inner and outer boom frames cooperating to provide said elongated boom, a guide frame is supported by said outer boom frame at the outer end of the boom and providing guiding means for a drilling tool, and means for mounting said guide frame at the outer portion of said outer boom frame.

6. A drill rig as set forth in claim 5 wherein said guide frame is elongated and is pivotally mounted at its forword portion on the outer apex portion of said triangular boom frame to tilt laterally about its pivot relative thereto in planes parallel to the pivotal axis of the pivotal connection between said boom frames.

7. A drill rig as set forth in claim 6 wherein an extensible self-locking power device is provided, means for operatively connecting said power device to said outer boom frame and said guide frame and operable to tilt said guide frame laterally about its pivot in such parallel planes and for locking the said guide frame against movement in its different tilted positions relative to said outer boom frame.

8. A drill rig as set forth in claim 4 wherein said side frames are independently tiltable in upright planes relative to said U-shaped boom frame about the axes of the pivotal connections of said legs of said U-shaped boom frame therewith whereby the base may traverse uneven or undulating terrain, and said extensible power devices are self-locking and are operable to lock said side frames against relative movement in their different tilted positions relative to said boom frame to hold the base steady during the drilling operation.

9. In a drill rig of the character disclosed, a mobile base, an articulated boom frame structure, means for pivotally mounting said boom frame structure on said base to swing in vertical planes relative to said base, a fluid actuated drilling tool carried by said boom structure at its outer portion, a transverse tubular conductor guiding and supporting member located near the pivotal articulation between and carried by the parts of said frame structure in parallelism with the pivotal axis, and fluid conductors for conducting fluid to the drilling tool including conductor portions extending within and through said transverse tubular member for support therein, said conductor portions being guided within said tubular member.

10. A drill rig as set forth in claim 9 wherein fluid motors are mounted on said base and means driven by said motors for propelling and steering the base, and fluid lines extend from a fluid conductor along the lower frame part of said boom frame structure for connection to said propelling and steering motors for supplying operating fluid to the latter, said fluid lines being supported by said lower boom frame part and swingable with the latter.

11. In a drill rig of the character disclosed, a mobile tractor base comprising separate side frames and endless tractor treads guided thereabout, means providing for independent relative movement of said side frames in upright planes, fluid operated motors mounted on said tread frames and operatively connected to said treads for driving said treads, an inverted U-shaped boom frame, means for pivotally mounting the legs of said U-frame at the inner sides of said tread frames, a fluid operated drilling tool, means for supporting said tool on said boom frame at the outer portion of the latter, and fluid conductors leading to the tool for supplying operating fluid thereto including conductor portions extending along and supported by the outer portion of said boom frame and fluid lines extending downwardly along the legs of said U-shaped frame for connection to said tread driving motors respectively, said fluid lines supported by and moving with the legs of said boom frame as the latter swings on its pivotal mounting means.

12. A drill rig as set forth in claim 11 wherein a transverse tubular member is provided, means carried at the outer portion of said U-shaped boom frame for mounting said tubular member thereon, said conductor portions extending within said tubular member for support therein, said conductor portions guided within and extending through said tubular member.

13. In a drill rig of the character disclosed, a mobile base having spaced apart side frames and ground engaging means carried thereby, said base having independent relative tilting movement in upright planes, an inverted U-shaped boom frame, means for pivotally connecting the legs of said boom frame on said side frames respectively, said pivotal connecting means providing for said independent tilting movement of said base side frames, extensible power jacks operatively connected between said side frames and the outer portion of said boom frame for tilting the latter, said jacks being self-locking and serving to lock said side frames in their relative tilted positions against tilting movement relative to each other, an outer boom frame, means for pivotally mounting said outer boom frame at the outer portion of said U-shaped boom frame to swing about an axis parallel with the pivotal axis of said U-shaped boom frame, an extensible power jack operatively connected between said inner and outer boom frames for tilting the latter about its pivot relative to said inner boom frame, said last mentioned jack being self-locking and serving to lock said outer boom frame in tilted position against pivotal movement relative to said inner boom frame, a drilling tool, and means for supporting said tool on said outer boom frame at the outer portion of the latter.

14. A drill rig as set forth in claim 13 wherein an elongated guide frame is pivotally mounted at the outer portion of said outer boom frame, said guide frame having guiding means along which the drilling tool is guided, and an extensible self-locking fluid jack is operatively connected between said outer boom frame and said guide frame for tilting the latter about its pivot and for locking the same in tilted position against pivotal movement relative to said outer boom frame.

15. In a drill rig of the character disclosed, a mobile base, an elongated adjustable supporting boom, means for pivotally mounting said boom on said base to swing in upright planes with respect to said base, said boom including an inner boom frame and an outer boom frame, means for pivotally mounting said outer boom frame on the outer extremity of said inner boom frame to swing relative to said inner boom frame about an axis parallel with the pivotal axis of said inner boom frame, said outer boom frame extending outwardly from and forming a continuation of said inner boom frame and mounted for adjustment between a relatively low position on said base and a relatively high position above said base, the pivotal connection between said inner and outer boom frames permitting the latter to swing together into substantially parallel adjacent folded positions, a drill guide frame having its forward portion carried at the outer portion of said outer boom frame for adjustment therewith and providing guiding means for a drilling tool, and means for mounting said guide frame at the outer portion of said outer boom frame.

16. A drill rig as set forth in claim 15 wherein said drill guide frame is elongated and means is provided for pivotally mounting said guide frame at its forward portion on the outer portion of said outer boom frame to tilt laterally relative thereto, said guide frame being adjustable with said outer boom frame in all angularly adjusted positions of said boom frames about their respective pivotal connections.

17. A drill rig as set forth in claim 15 wherein said boom frame is adjustable on said pivotal mounting means to position said guide frame vertically substantially at the center of said base and means is provided for swinging said boom frames about their respective pivots relative to said base to position said guide frame vertically as aforesaid substantially at the center of said base.

18. A drill rig as set forth in claim 15 wherein said base has spaced apart side frames and ground engaging means carried thereby, and said inner boom frame part is of inverted U-shape and has laterally spaced legs, and said outer boom frame is swingable on said pivotal mounting means into a position wherein it extends in the space between the legs of said U-shaped frame.

19. A drill rig as set forth in claim 18 wherein the forward portion of said drill guide frame is adjustable with said outer boom frame into a position wherein it also extends in the space between the legs of said U-shaped frame.

20. A drill rig as set forth in claim 15 wherein said outer boom frame is swingable about its pivot of said pivotal mounting means relative to said inner boom frame from a position wherein said boom frames are folded together in substantial parallelism to a position wherein said frames are angularly disposed substantially 90° apart.

21. A drill rig comprising a mobile base having propelling and steering means including spaced apart side frames having independent relative tilting movement in upright planes, a boom structure having spaced lower portions, means for pivotally mounting said spaced lower portions on said side frames of said base to swing in upright planes with respect thereto, said pivotal mounting means providing pivots for said side frames whereby the latter may independently tilt as aforesaid, said boom structure including an inner boom frame providing said spaced lower portions and an outer boom frame, means for pivotally supporting said outer boom frame on said inner boom frame to swing about an axis parallel with the pivotal axes of said spaced lower portions of said inner boom frame, said outer boom frame cooperating with said inner boom frame to form an elongated boom, an elongated guide frame providing guiding means for a drilling tool, means for pivotally mounting said guide at its forward portion on the outer portion of said outer boom frame and for confining the same to movement relative to said outer boom frame in planes parallel with the pivotal axis between said boom frames, means for swinging said boom frames about their respective pivots to vary the position of the outer end of the boom, and means for swinging said guide frame laterally about its pivot relative to said outer boom frame while said guide frame is confined to movement in such parallel planes.

22. A drill rig comprising a mobile base, a boom frame pivotally mounted on said base to swing in longitudinal vertical planes relative thereto about a horizontal axis extending transversely of said base and comprising articulated inner and outer boom frame parts, the pivotal axis between the articulated parts arranged parallel with the boom pivot axis, a transverse member supported by said boom frame and having its axis aligned with the pivotal axis between said boom frame parts, means for swinging said boom frame parts about their respective pivots, an elongated guide frame extending in parallelism with said outer boom frame part and providing guiding means for a drilling tool, means for pivotally mounting said guide frame at its forward end on the outer portion of said outer boom frame part to swing laterally in planes parallel with the pivotal axis of said outer boom frame part, a sliding pivotal connection between said guide frame and said transverse member and spaced rearwardly longitudinally of said guide frame from said pivotal mounting means, and means for securing said sliding pivotal connection in different adjusted positions along said transverse member to hold said guide frame in different angular positions about its forward pivotal axis.

23. A drill rig as set forth in claim 22 wherein said inner boom frame part is of U-shape and said transverse member provides the connecting portion between the legs of the U-frame with said legs pivotally mounted at the sides of said base.

24. A drill rig as set forth in claim 22 wherein an extensible power device is connected between said outer boom frame part and said sliding pivotal mounting for swinging said guide frame laterally into different angular positions about its forwardly located pivot.

25. A drill rig as set forth in claim 23 wherein said mobile base comprises side frames having mobility providing means and the legs of said U-frame are pivotally mounted at the inner sides of said base side frames and extensible power devices are connected between said side frames and the outer portion of said U-frame for swinging the latter about its pivot.

26. A drill rig as set forth in claim 25 wherein an extensible power device is connected between the outer portion of said U-frame and the outer portion of said outer boom frame part for swinging the latter about its pivot relative to said U-frame.

References Cited in the file of this patent

UNITED STATES PATENTS

| | | |
|---|---|---|
| 1,535,411 | Hansen | Apr. 28, 1925 |
| 2,174,415 | Curtis | Sept. 26, 1939 |
| 2,446,242 | Orshansky | Aug. 3, 1948 |
| 2,614,808 | Curtis et al. | Oct. 21, 1952 |
| 2,621,896 | Feucht | Dec. 16, 1952 |
| 2,665,116 | Brink et al. | Jan. 5, 1954 |
| 2,745,637 | Ball | May 15, 1956 |
| 2,750,155 | Nixon | June 12, 1956 |